US008833545B2

(12) United States Patent
Perl

(10) Patent No.: US 8,833,545 B2
(45) Date of Patent: Sep. 16, 2014

(54) METHOD AND DEVICE OF HANDLING PACKAGES

(75) Inventor: Kurt Perl, Rimsting (DE)

(73) Assignee: Krones AG, Neutraubling (DE)

( * ) Notice: Subject to any disclaimer, the term of this patent is extended or adjusted under 35 U.S.C. 154(b) by 872 days.

(21) Appl. No.: 12/599,986

(22) PCT Filed: May 9, 2008

(86) PCT No.: PCT/EP2008/003742
§ 371 (c)(1),
(2), (4) Date: Aug. 31, 2010

(87) PCT Pub. No.: WO2008/138556
PCT Pub. Date: Nov. 20, 2008

(65) Prior Publication Data
US 2010/0316479 A1    Dec. 16, 2010

(30) Foreign Application Priority Data

May 14, 2007  (DE) .......................... 10 2007 022 909
Dec. 27, 2007 (DE) .......................... 10 2007 063 289

(51) Int. Cl.
B65G 47/08    (2006.01)
B65G 17/34    (2006.01)
B07C 5/36     (2006.01)
B65G 47/244   (2006.01)
B65G 47/51    (2006.01)
B65G 61/00    (2006.01)

(52) U.S. Cl.
CPC ............ B65G 47/086 (2013.01); B65G 17/345 (2013.01); B07C 5/36 (2013.01); *B65G 2201/02* (2013.01); *B65G 2207/18* (2013.01); B65G 47/244 (2013.01); B65G 47/5113 (2013.01); B65G 61/00 (2013.01)

USPC ................... 198/793; 198/370.01; 198/347.1; 198/370.06

(58) Field of Classification Search
USPC ............... 198/347.1, 370.03, 370.04, 370.05, 198/370.06, 373, 377.01, 377.03, 377.07, 198/377.1, 378, 394, 397.06, 400, 401, 408, 198/419.3, 474.1, 575, 597, 793, 803.2, 198/347.4, 374, 411, 415, 440, 617, 890.1; 212/331; 414/564, 744.3, 744.8, 788, 414/788.1, 789.5, 789.6, 791.6, 792.6, 414/792.7, 792.8, 792.9, 793.9, 799, 922, 414/923, 927, 928, 757, 768, 769, 774, 777, 414/779, 784, 792, 792.4; 104/35, 36, 43, 104/46; 108/139; 271/184
See application file for complete search history.

(56) References Cited

U.S. PATENT DOCUMENTS 2,291,971 A * 8/1942 Lienau et al. ................. 212/273
3,627,103 A   12/1971 Leach
(Continued)

FOREIGN PATENT DOCUMENTS

DE    2945883 A    5/1981
DE    3409964 A1   9/1985
(Continued)

*Primary Examiner* — Gregory Adams
(74) *Attorney, Agent, or Firm* — Marshall, Gerstein & Borun LLP

(57) ABSTRACT

A method and device for handling packs or similar unit loads in a packaging plant where packs exiting from a packaging machine are distributed and in the process optionally rotated and palletized in a palletizer, wherein distribution, rotation and palletizing are performed essentially continuously and directly consecutively from the packaging machine to the palletizer.

16 Claims, 4 Drawing Sheets

(56) References Cited

U.S. PATENT DOCUMENTS

| | | | |
|---|---|---|---|
| 3,757,966 A * | 9/1973 | Cox et al. | 414/792.1 |
| 4,019,627 A * | 4/1977 | Eggert et al. | 198/786 |
| 4,026,422 A | 5/1977 | Leenaards | |
| 5,092,447 A | 3/1992 | Wyman | |
| 5,100,284 A * | 3/1992 | Boisseau | 414/744.3 |
| 5,320,478 A | 6/1994 | Gonsowski et al. | |
| 5,547,084 A * | 8/1996 | Okada et al. | 209/583 |
| 5,588,520 A * | 12/1996 | Affaticati et al. | 198/370.06 |
| 5,975,837 A * | 11/1999 | Focke et al. | 414/792.9 |
| 6,257,826 B1 | 7/2001 | Neagle et al. | |
| 6,390,276 B1 * | 5/2002 | Haug et al. | 198/377.01 |
| 6,474,462 B2 * | 11/2002 | Wipf et al. | 198/347.1 |
| 6,478,138 B1 * | 11/2002 | Edwards et al. | 198/370.06 |
| 6,520,314 B1 * | 2/2003 | Seiling | 198/375 |
| 6,591,966 B1 * | 7/2003 | Lee et al. | 198/415 |
| 6,622,846 B1 * | 9/2003 | Dean | 198/370.09 |
| 6,658,816 B1 * | 12/2003 | Parker et al. | 53/397 |
| 6,725,998 B2 * | 4/2004 | Steeber et al. | 198/347.4 |
| 6,959,802 B1 * | 11/2005 | Garvey | 198/347.1 |
| 7,121,398 B2 * | 10/2006 | Affaticati et al. | 198/357 |
| 2004/0069596 A1 | 4/2004 | Davis et al. | |
| 2004/0223839 A1 * | 11/2004 | Simkowski | 414/791.6 |

FOREIGN PATENT DOCUMENTS

| | | |
|---|---|---|
| DE | 19626826 A1 | 1/1998 |
| DE | 20021874 | 7/2002 |
| DE | 202005015268 U1 | 2/2007 |
| EP | 1046598 A1 | 10/2000 |
| EP | 1293453 A1 | 3/2003 |
| WO | WO-01/51390 A1 | 7/2001 |

\* cited by examiner

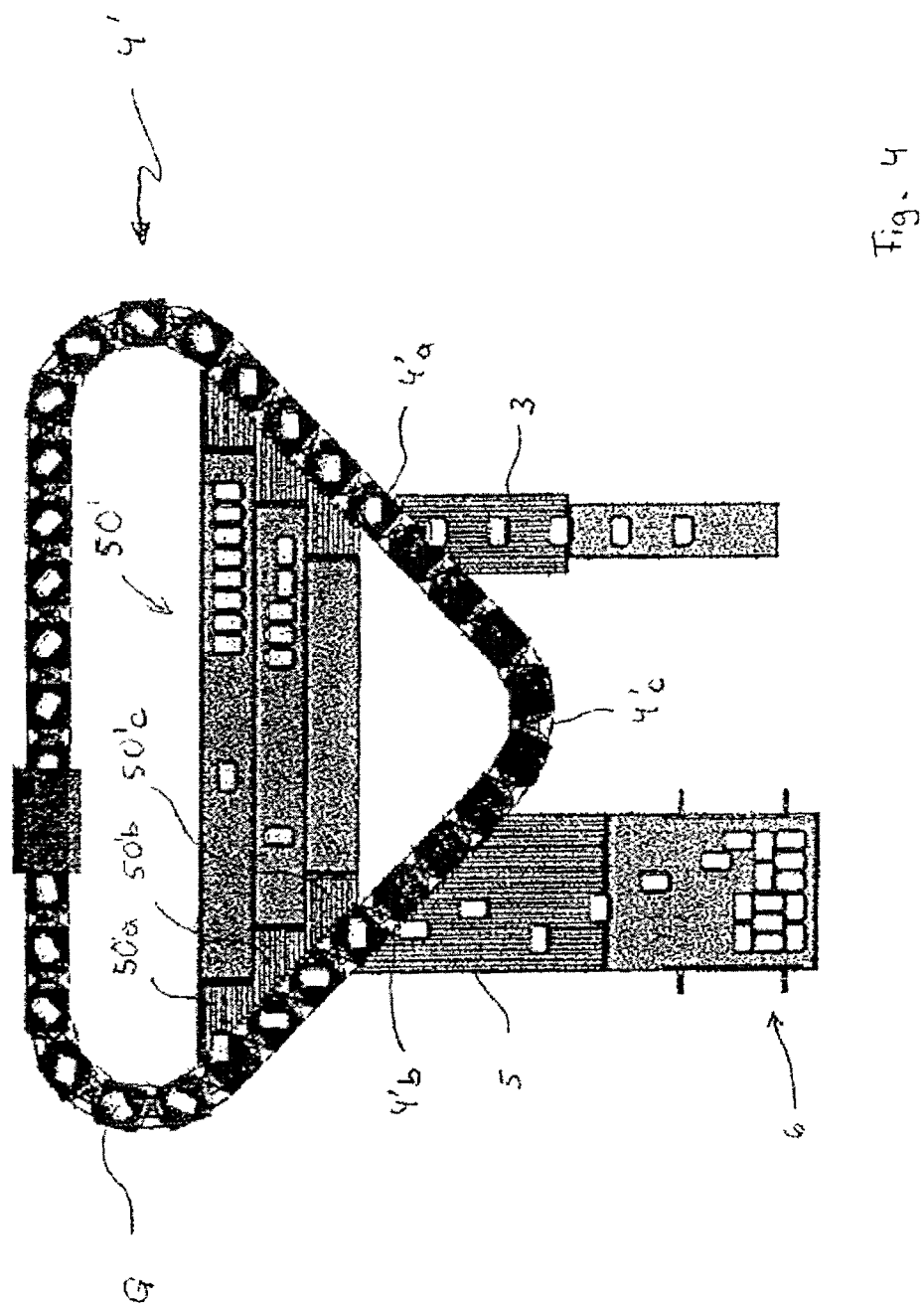

METHOD AND DEVICE OF HANDLING PACKAGES

CROSS-REFERENCE TO RELATED APPLICATION

The present application claims the benefit of priority of International Patent Application No. PCT/EP2008/003742, filed May 9, 2008, which application claims priority of German Patent Application No. 10 2007 022 909.9, filed May 14, 2007 and German Patent Application No. 10 2007 063 289.6, filed Dec. 27, 2007. The entire text of the priority application is incorporated herein by reference in its entirety.

FIELD OF THE DISCLOSURE

The invention relates to a method and a device for handling packs in a packaging plant, such as between a packaging machine and a palletizer.

BACKGROUND

Such a method and a device of this type are known from DE 196 26 826 A1. The known device contains a lifting head by means of which items already packed into shipping boxes can be palletized. The boxes with the items packed in them enter the working range of the lifting head via a plurality of linear conveyors and are picked up by the lifting head and put down onto pallets. This citation does not describe how and by means of which machines the items are packed into the boxes. Furthermore, it is not necessary to rotate the boxes in the known device.

DE 200 21 874 describes a device for palletizing and depalletizing articles onto and from pallets in layers. The device contains a plurality of load take-up devices for transferring the articles to and from a pallet, where the load take-up device can be controlled to move vertically as well as horizontally. The transfer station contains a first and a second transfer device which are each provided with separate controlled motor drives which can operate independently. No packaging device, nor any devices by means of which the articles can be rotated, if necessary, are obvious.

In prior art, other packaging plants are known, in particular from the beverage filling industry, where at least one packaging machine that preferably operates continuously is linked to a palletizer that normally operates discontinuously for arranging shipping units standing on pallets via intermediate conveyors, means for rotating and/or distributing packing units to various conveyor paths, and collecting means for forming layers of pack unit loads. Disadvantageously, this connecting section between the packaging machine and the downstream palletizer is often very space consuming, as on the one hand buffer paths must be provided due to the transition from a continuously operating machine to a discontinuously operating machine, and as, in particular in case of packaging machines including a downstream thermal treatment unit, such as e.g. a shrink tunnel, there often exists a basic condition that, in case of a downstream plant failure e.g. in the area of the palletizer, it must be possible to drive empty at least through such a shrink tunnel. The comparably large space requirement for this as well as the limitation of the palletizer's production performance due to the discontinuous mode of operation are felt to be disadvantageous.

SUMMARY OF THE DISCLOSURE

In view of this, an aspect underlying the disclosure is to provide an improved device and an improved method for handling packs or other unit loads in packaging plants, which, while offering a high production output, require as little space as possible, at the same time providing high operational reliability.

Due to the always continuous mode of operation of the work stations interlinked in the direction of the material flow, all working steps relevant for a packaging plant in this section can be continuously synchronized optimally as concerns their motion sequences. Thereby, all functional units involved in this successive procedure can be arranged closer together, so that maximum performances can be realized in spite of a very compact arrangement and correspondingly only little required space.

This is of economical importance in particular for handling non-returnable packs in the beverage filling industry, as for example in case of groups of bottles wrapped in a heat shrinking foil in the actual filling and packaging section of a plant, one could operate with very high performances already in the past, and as now even in the further procedure downstream of a packaging machine on the side of the palletizing process, operation can advantageously be continued with the same high performance, whereby now even maximum palletizing performances can be achieved with a pack and pallet transport close to the floor, and no longer with the very long up-gradient sections for high-performance palletizers with an overhead pack supply that was necessary in the past.

In many packaging machines, in particular in shrink tunnels or the like, provisions should be made to permit to run empty at least the packaging machine if the feed is stopped downstream of the packaging machine. According to the disclosure, this is achieved in a space-saving and economical manner by designing the rotation/distribution station such that it picks up the packs still located in the packaging machine if conveyance is stopped. This can on the one hand be accomplished by using the already unloaded area of a continuous conveyor that is being returned to the running-in for picking up these additional packs. In addition or as an alternative, the conveyor of the rotation/distribution station can also be provided with additional conveyor means which can temporarily pick up these excessive packs and is not used during normal conveyor operation. These additional separate conveyor means can be accommodated inside a continuous conveyor in a space-saving manner and can connect areas of the continuous conveyor on a shortened path.

Essential components of the device are on the one hand a rotation/distribution station operating continuously as well as a palletizer that also altogether operates approximately continuously. The rotation/distribution station is equipped with a plurality of handling means movable on a closed circular path with an invariable direction of circulation, which handling means can be engaged with the packs, so that several packs exiting from a packaging machine can be always discharged simultaneously, while they are passing the rotation/distribution station, to a layer formation place on a section of the circular path of this rotation/distribution station at least corresponding to the distribution pattern suited for the layer to be supplied to the subsequent palletizer. Moreover, the packs can be rotated beforehand to obtain certain positions of orientation, if required.

As soon as the number of packs required for a given orientation pattern for completing a complete pack layer stands by, the same can be centered on each side and be shifted into a transfer head of the palletizer standing by at a pack layer supply place, or it can be received by the palletizer. The particularity of the palletizer is that several such transfer heads are employed and essentially continuously moved in the same direction on a closed circular path. Each of these transfer heads arranged in an offset manner in the direction of circulation is held by an extension arm, for example mounted in a circulation guideway located in a horizontal plane so as to be movable, which extension arm can lift and lower a transfer head perpendicularly to this horizontal circulation plane via a separate, preferably electromotive drive by program control during a complete circulating motion, if required by individual control. These motions can vary in successive circulations.

By means of motors that can be driven by program control, the individual extension arms can also independently circulate along the horizontal guideway provided to this end with arbitrary distances between them, or they can be fixed at regular spaces to a centrally driven belt and chain drive, such as e.g. a chain or a sprocket belt.

Along the circular path of the transfer heads, several pick-up stations, e.g. for picking up a pack layer, for taking hold of an empty pallet, for picking up possibly required intermediate layers, are provided, as well as at least one loading station for putting down the pack layers onto a pallet in layers, possibly with intermediate layers inserted in-between.

Preferably, transport or conveyor means for feeding or removing the above mentioned items are assigned to the mentioned stations.

To process in particular non-returnable packs with intermediate layers, a palletizer having altogether four or more transfer heads is particularly advantageous to achieve maximum performance. In a particularly preferred manner, each of the transfer heads is formed by a construction generally known to experts by the terms multiflap or roller carpet head, which comprises a divisible load bearing area formed of a plurality of parallel, freely rotating rollers and can form a closed supporting plane for a pack layer in one working position, while in a working position for releasing a pack layer on a pallet below the same, it can be preferably pulled away to the side to permit to put down the pack layer (cf. DE 2945883 A1, DE 3409964 A1). Such multiflap or roller carpet gripper heads can furthermore be provided with controllable attachments for taking hold of pallets and/or intermediate layers which permit them to optionally take hold of a pallet or an intermediate layer at their bottom sides and to place it down at the loading station.

The use of several transfer heads to transfer pack layers, pallets and intermediate layers moreover permits high redundancy, mainly if each of the transfer heads can be actuated along its circulation guideway by individual control by a separate independent drive. Defective transfer heads can further circulate in a lifted position essentially without any loss in performance without any need to immediately stop and check the palletizer.

BRIEF DESCRIPTION OF THE DRAWINGS

Below, a preferred embodiment will be described with reference to the figures. In the drawings:

FIG. 4 shows a plan view of another embodiment of a rotation/distribution station.

DETAILED DESCRIPTION OF THE PREFERRED EMBODIMENT

Figure 1:
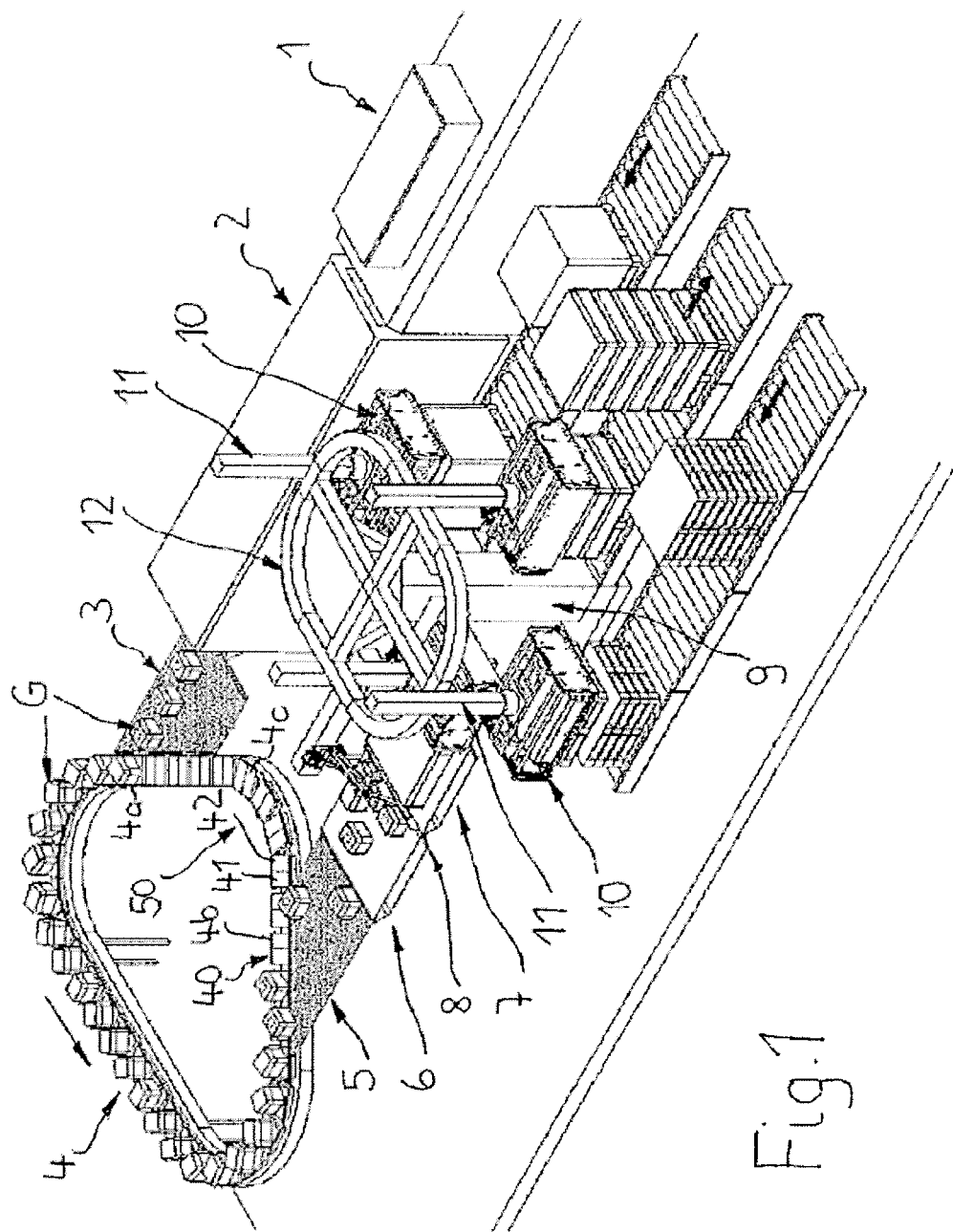
FIGS. 1 and 2 show a section of a packaging plant each in a perspective representation seen from two different angles of view.

In the figures, only the end section of a packaging plant is shown which can be located, for example, at the end of a beverage filling line where bottles of glass or plastics are wrapped in groups, for example into cardboards and/or heat-shrinkable plastic foil, where in the case of a heat shrinking foil being used, a preferably thermal heat-shrinking treatment is effected to apply the foil to the packs G formed in this manner. Packing is accomplished with a preferably continuously operating packaging machine 1 which is followed, if required, by a shrink tunnel 2 downstream thereof, seen in the direction of flow, which shrink tunnel is followed—at its discharge side—by a metering conveyor 3 which is driven in a controlled manner and delivers the packs G exiting with the separation grid of the upstream packaging machine 1 to a rotation and distribution station 4 in a controlled manner to achieve accurate positioning.

This rotation and distribution station 4 comprising an essentially delta-shaped circular path comprises a plurality of transport wagons 40 driven continuously counter clockwise along the circular path at equal distances, each of the wagons comprising one supporting space for one pack each formed by two conveyor belts 41 and 42 oriented in parallel to each other and transversely to the direction of the circular path, where the two parallel conveyor belts 41, 42 can be controlled independently to be driven in the same direction or in opposite directions, for example by integrated barrel engines, to be able to perform, apart from a shifting motion performed transversely to the circular path for picking up and handing over packs G, a rotation of the pack about its vertical axis on the two conveying belts by a translatory motion in the opposite direction, if required.

A transfer conveyor 5 is arranged following the rotation and distribution station 4 in the direction of the pack flow to which the packs fed and oriented by the distribution conveyor 4 can be handed over at offset handing-over points to various conveyor paths of the transfer conveyor arranged at a lateral distance, by the two parallel conveyor belts 41, 42 forming one transport wagon 40 each laterally shifting away the individual packs G at the various deposition points corresponding to their predetermined conveyor path by a drive in the same direction, which packs are then handed over to a conveyor section 6 forming the layer formation place where all individual packs G forming a complete pack layer with a predetermined layer pattern are collected.

For this, a stop bar 8 controllable along the conveyor direction and perpendicularly thereto can be arranged at the end section of this conveyor 6, which stop bar forms a holding point for collecting a pack layer. This is followed, in the direction of the pack flow, by a pack layer provision place 7 on which a complete pack layer which is possibly centered there from each side is kept ready for being shifted into a roller carpet head 10. As soon as such a roller carpet head is positioned at the same level adjacent to the provision place 7, the centered pack layer that is standing by can be laterally introduced into the roller carpet head, where the slide 8 that can be controlled so as to be traversed possibly supports shifting.

The palletizer 9 comprises a circulation guideway 12 horizontally held at the upper end of a supporting column, along which guideway altogether four roller carpet heads 10 are guided to run counter clockwise by means of suspensions 11 mounted at the circulation guideway so as to be mobile. Preferably, each suspension has a separate, independently program-controlled electromotive drive for the horizontal circulating motion, i.e. motions without fixed spaces are possible.

Furthermore, each suspension 11 comprises a guideway vertical, i.e. perpendicular to the circulating plane with a separate, also program-controlled electromotive drive for a vertical lifting movement for a roller carpet head 10. By superposing both movements, any arbitrary path can be generated for the roller carpet heads 10. Apart from the already mentioned pack layer provision place 7, there are along the circulation guideway 12, offset by nearly 90 degrees, a pallet provision place 13, a loading place 14, and an intermediate layer provision place 15. The three latter places are each formed by end sections of conveyors assigned near the floor by means of which empty pallet stacks and intermediate layer stacks can be fed and loaded full pallets removed.

In the loading operation, a first roller carpet head 10 first takes hold of an empty pallet at the upper end of the empty pallet stack standing by at the pallet provision place 13 and puts the pallet down at the loading place 14. Then it takes hold of an intermediate layer at the intermediate layer provision place 15 with its controllable suction cups attached to its bottom side, which layer is then taken along to the provision place 7 under the roller carpet, where now a complete pack layer is laterally introduced on the upper side of the roller carpet. Now, the roller carpet head 10 is moved further to the loading place 14 by its program-controlled, motor-actuated suspension 11, where it puts down its pack layer with the intermediate layer held at the bottom side onto pack layers already put down before by the other roller carpet heads. This cycle is repeated until a pallet is completely loaded. Then, the loaded pallet is carried away and replaced by a new empty pallet.

As the suspensions 11 can pass along the circulating guideway at variable distances, it is possible to pick up the formed pack layers at the provision place 7 at short distances, so that a continuous supply of packs can be realized with maximum performances.

The rotation/distribution station 4 includes a continuous conveyor with a running-in area 4a which is assigned to the metering conveyor 3 in the represented embodiment, and a discharge area 4b which is here assigned to the transfer conveyor 5. In the drawn delta-shaped embodiment of the continuous conveyor, the two areas 4a, 4b are located on adjacent legs of the delta shape and are connected to each other by a return area 4c that leads over an apex of the delta shape and is normally not occupied by packs G. The return area 4c thus forms a storage area 50 by means of which additional capacity for packs is provided. In the represented embodiment, the storage area 50, i.e. the apex of the delta shape, projects into the space between the metering conveyor 3 and the transfer conveyor 5 which is required anyway, so that the storage area 50 does not occupy any additional space.

In case of a malfunction in the area of the palletizer, the area of the shrink tunnel sensible for the heat shrinking foil of the packs can be first driven empty by temporarily occupying the carrying spaces of the transport wagons 40 of the rotation and distribution station 4 in the storage area 50 between the transfer conveyor 5 and the metering conveyor 3 arranged at a lateral distance thereto, which carrying spaces remain empty in normal trouble-free operation. When the plant is started again, the packs intermediately stored there first must be removed and then discharged to the transfer conveyor 5 before the regular operating state is restored.

Figure 2:
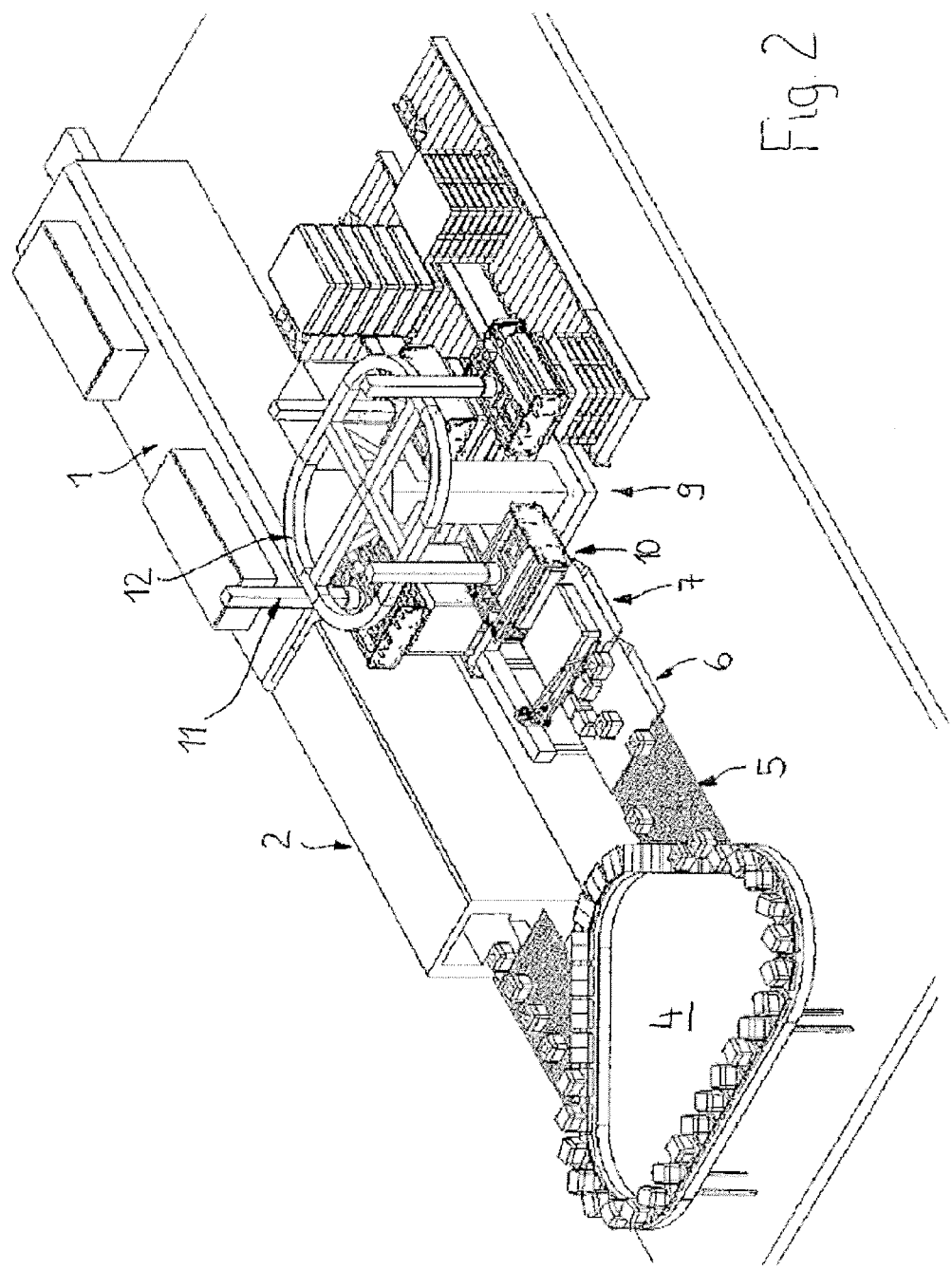
Figure 3:
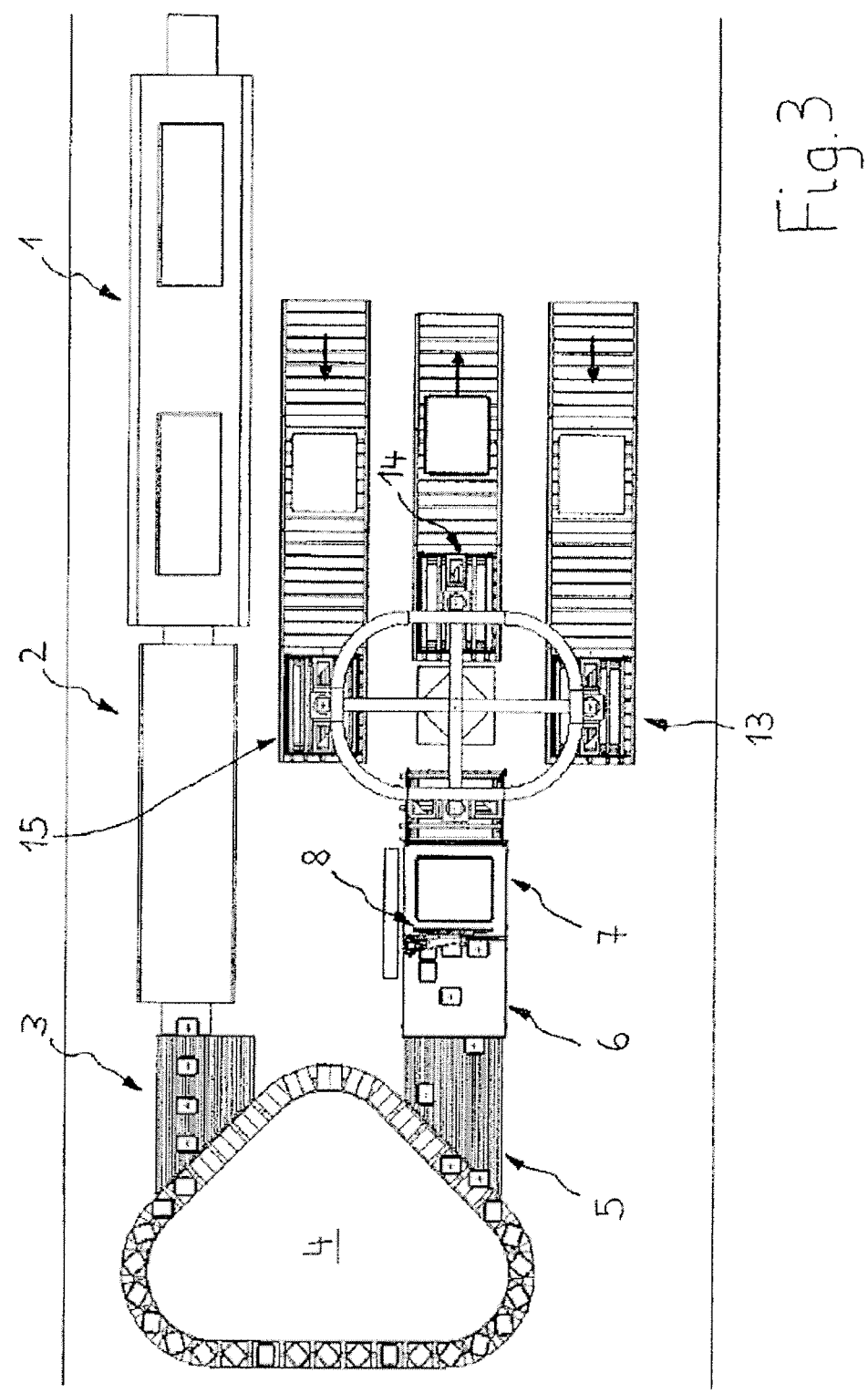
FIG. 3 shows a plan view of the packaging plant in FIGS. 1 and 2.

FIG. 4 shows a further embodiment of a rotation/distribution station 4' embodied according to the disclosure which differs from the rotation/distribution station 4 of FIGS. 1 to 3 only in the details described below. Identical components are marked with the same reference numerals and are not illustrated again.

The rotation/distribution station 4' preferably contains the continuous conveyor of the first embodiment circulating in the shape of a delta and again comprises a running-in area 4'a assigned to the metering conveyor 3, a discharge area 4'b to which the transfer conveyor 5 is assigned, and a return path 4'c located therebetween which normally does not contain any packs G and can be used as a storage area 50 just as in the first embodiment.

However, the rotation/distribution station 4' contains a further storage area 50' formed by at least one additional separate conveyor means. In the represented embodiment, the storage area 50' contains three additional conveyor means 50'a, 50'b and 50'c. The additional conveyor means 50'a to 50'c are preferably embodied as linear conveyors and arranged inside the continuous conveyor. They connect two areas of the continuous conveyor such that the packs G can be fed to the additional conveyor means on the one side and picked up from the other side. Preferably, the additional conveyor means 50'a to 50'c are assigned with their running-in sides to the running-in area 4'a, and with their discharge sides to the discharge area 4'b. The additional conveyor means 5'a to 5'c, too, are dimensioned such that the packaging machine 2 can be driven empty at least if conveyance fails.

All movements of the rotation and distribution station 4, 4 of the palletizer 9 as well as of all corresponding conveyor means are coordinated by SPS-controls and synchronized.

In variation to the described and drawn embodiments, the rotation/distribution station can be formed by other conveyors or by continuous conveyors of a different type. The storage area, in particular the additional conveyor means of the storage area, can be of the same conveyor type as the conveyor of the rotation/distribution station, as it is represented, i.e. they can be provided with a conveyor surface for putting up the packs G and with elements for rotating the packs, however, they can also be embodied for a different type of conveyance, for example for a suspended conveyance. The rotation of the packs cannot only be effected by the parallel conveyor belts. Grippers, robot arms, retractable obstacles or similar known constructions can be rather employed.

I claim:

1. A method for handling a plurality of packs between a packaging machine and a palletizer in a packaging plant, comprising the steps of:
    positioning a pack of the plurality of packs onto a transport wagon of a plurality of transport wagons positioned along a closed looped path, wherein the closed looped path is constructed in a generally delta shape and wherein the transport wagon comprises two conveyor belts positioned such that each of the two conveyor belts provide support for the pack;
    moving the two conveyor belts in opposing directions to rotate the pack to a desired position on the transport wagon;
    moving the transport wagon along the closed looped path with at least one storage conveyor positioned within the closed looped path, wherein the storage conveyor connects two locations positioned on the closed looped path permitting the storage conveyor to receive the pack from the transport wagon at one location on the closed looped path and deliver the pack to a second location on the closed looped path; and
    moving the two conveyor belts in a same direction to remove the pack from the transport wagon with the transport wagon reaching a predetermined position along the closed looped path.

2. The method of claim 1 further including the step of conveying the pack with a conveyor from the packaging machine toward the transport wagon such that the pack is positioned on the conveyor to align with the transport wagon with the pack reaching the transport wagon at the closed looped path.

3. The method of claim 2 further including the step of moving the two conveyor belts in another same direction to assist positioning the pack onto the transport wagon from the conveyor which conveys the pack from the packaging machine toward the transport wagon.

4. The method of claim 1 further including the step of conveying the pack removed from the transport wagon away from the transport wagon toward the palletizer.

5. The method of claim 4 further including step of depositing the pack at a location for formation of a layer of packs.

6. The method of claim 1 further providing a plurality of transport wagons positioned within the closed looped path between the predetermined position and a position along the path at which the pack is positioned onto the transport wagon such that the plurality of transport wagons move in a direction from the predetermined position toward the position along the path at which the pack is positioned onto the transport wagon.

7. A device for handling a plurality of packs in a packaging plant between a packaging machine and a palletizer, comprising:
- a plurality of transport wagons positioned to travel along a closed looped path wherein the closed looped path is constructed in a generally delta shape, wherein at least one of the wagons comprises two conveyor belts that are positioned such that each of the two conveyor belts provide support to a portion one of the packs of the plurality of packs positioned on the at least one transport wagon, and wherein each of the two conveyor belts is independently operable such that the two conveyor belts are moveable in opposite directions and are moveable in the same direction and
- at least one storage conveyor positioned within the closed looped path wherein the storage conveyor connects two locations positioned on the closed looped path so as to receive the one of the packs of the plurality of packs from the at least one transport wagon at one location on the closed looped path and to deliver the one of the packs to a second location on the closed looped path.

8. The device for handling packs of claim 7 wherein the two conveyor belts are positioned generally parallel to one another and are oriented generally transverse to the direction of the closed looped path.

9. The device of handling packs of claim 8 wherein the two conveyor belts are operated in a first same direction to remove the pack positioned on the two conveyor belts from the transport wagon.

10. The device of handling packs of claim 9 further including a conveyor to carry the pack removed from the transport wagon toward the palletizer.

11. The device of handling packs of claim 8 wherein the two conveyor belts are operated in a second same direction to position the pack onto the transport wagon.

12. The device of handling packs of claim 11 further including a conveyor to carry the pack from the packaging machine to the transport wagon.

13. The device of handling packs of claim 7 wherein the closed looped path of the plurality of transport wagons includes a predetermined position on the path for removing the pack from the transport wagon and includes a position spaced apart from the predetermined position at which the pack is positioned onto the transport wagon, wherein transport wagons are positioned in the closed looped path between the predetermined position and the position and move in a direction from the predetermined position toward the position.

14. The device of handling packs of claim 7 wherein moving the two conveyor belts with the at least one transport wagon at the one location.

15. The device of handling packs of claim 7 further including the palletizer comprising transfer heads controlled to move on a closed circular path in the same direction.

16. The device of handling packs of claim 15 the transfer heads are mounted at movable suspensions to move the transfer heads in horizontal and vertical directions.

\* \* \* \* \*